(12) United States Patent
Ash et al.

(10) Patent No.: US 10,754,219 B2
(45) Date of Patent: Aug. 25, 2020

(54) ADDRESSABLE ELECTRO-OPTIC DEVICE

(71) Applicant: Gentex Corporation, Zeeland, MI (US)

(72) Inventors: Kevin L. Ash, Grand Rapids, MI (US); Sue F. Franz, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 36 days.

(21) Appl. No.: 16/024,206

(22) Filed: Jun. 29, 2018

(65) Prior Publication Data

US 2019/0004387 A1    Jan. 3, 2019

Related U.S. Application Data

(60) Provisional application No. 62/526,616, filed on Jun. 29, 2017.

(51) Int. Cl.
| | | |
|---|---|---|
| *G02F 1/153* | (2006.01) | |
| *G02F 1/161* | (2006.01) | |
| *G02F 1/155* | (2006.01) | |
| *G02F 1/163* | (2006.01) | |

(52) U.S. Cl.
CPC .............. *G02F 1/161* (2013.01); *G02F 1/155* (2013.01); *G02F 1/163* (2013.01); *G02F 2201/122* (2013.01); *G02F 2201/56* (2013.01); *G02F 2202/025* (2013.01); *G02F 2203/48* (2013.01)

(58) Field of Classification Search
CPC ....................................................... G02F 1/161
USPC ....................................................... 359/275
See application file for complete search history.

(56) References Cited

U.S. PATENT DOCUMENTS

| | | | |
|---|---|---|---|
| 5,042,923 | A | 8/1991 | Wolf et al. |
| 5,668,663 | A | 9/1997 | Varaprasad et al. |
| 5,724,187 | A | 3/1998 | Varaprasad et al. |
| 5,805,330 | A | 9/1998 | Byker et al. |
| 5,940,201 | A | 8/1999 | Ash et al. |
| 6,002,511 | A * | 12/1999 | Varaprasad ....... B32B 17/10036 359/265 |
| 6,045,643 | A | 4/2000 | Byker et al. |
| 6,239,898 | B1 | 5/2001 | Byker et al. |
| 6,407,847 | B1 | 6/2002 | Poll et al. |
| 6,433,913 | B1 | 8/2002 | Bauer et al. |
| 6,567,708 | B1 | 5/2003 | Bechtel et al. |
| 6,597,489 | B1 | 7/2003 | Guarr et al. |
| 7,085,609 | B2 | 8/2006 | Bechtel et al. |
| 7,256,923 | B2 | 8/2007 | Liu et al. |
| 7,502,156 | B2 | 3/2009 | Tonar et al. |
| 7,525,714 | B2 | 4/2009 | Poll et al. |
| 7,535,614 | B1 | 5/2009 | Tapley et al. |

(Continued)

*Primary Examiner* — James C. Jones
(74) *Attorney, Agent, or Firm* — Price Heneveld LLP; Bradley D. Johnson

(57) ABSTRACT

An electro-optic device includes a front substrate defining a first surface and a second surface. A rear substrate defines a third surface and a fourth surface. A seal is disposed about a periphery of the second surface and the third surface. A space is defined between the front substrate, the rear substrate, and the seal. An electro-optic medium is disposed within the space. A first conductive material is disposed on the second surface of the front substrate. A second conductive material is disposed on the third surface of the rear substrate. At least one isolation line extends across at least one of the first conductive material and the second conductive material to define independently controlled dimming regions.

19 Claims, 6 Drawing Sheets

(56) References Cited

U.S. PATENT DOCUMENTS

| | | |
|---|---|---|
| 7,690,414 B2 | 4/2010 | Knowles |
| 7,822,490 B2 | 10/2010 | Bechtel et al. |
| 7,990,603 B2 | 8/2011 | Ash et al. |
| 8,169,684 B2 | 5/2012 | Bungo et al. |
| 8,494,663 B2 | 7/2013 | Lamoree et al. |
| 8,502,098 B1 | 8/2013 | Byrne et al. |
| 8,560,966 B2 | 10/2013 | Cotterill |
| 9,019,090 B2 | 4/2015 | Weller et al. |
| D733,740 S | 7/2015 | Lee et al. |
| D733,741 S | 7/2015 | Lee et al. |
| 9,205,914 B1 | 12/2015 | Fagan et al. |
| 9,220,155 B2 | 12/2015 | Chang et al. |
| 9,341,912 B2 | 5/2016 | Shrivastava et al. |
| D762,180 S | 7/2016 | Young et al. |
| 9,503,083 B2 | 11/2016 | Matsuda et al. |
| 9,606,412 B2 | 3/2017 | Geerlings et al. |
| 9,650,141 B2 | 5/2017 | Fagan et al. |
| 9,789,949 B2 | 10/2017 | Hontz et al. |
| 9,994,091 B2 | 6/2018 | Kaphengst et al. |
| 2005/0150589 A1 | 7/2005 | Amos et al. |
| 2005/0200933 A1 | 9/2005 | Weidner |
| 2007/0285759 A1 | 12/2007 | Ash et al. |
| 2008/0030836 A1 | 2/2008 | Tonar et al. |
| 2008/0066971 A1 | 3/2008 | Whang et al. |
| 2008/0230653 A1 | 9/2008 | Mitchell et al. |
| 2009/0015736 A1 | 1/2009 | Weller et al. |
| 2010/0085511 A1 | 4/2010 | Watanabe et al. |
| 2011/0221509 A1 | 9/2011 | Bergamo et al. |
| 2011/0255142 A1 | 10/2011 | Ash et al. |
| 2012/0049759 A1 | 3/2012 | Pezzutti et al. |
| 2012/0217346 A1 | 8/2012 | Eberle et al. |
| 2013/0021278 A1 | 1/2013 | Landau et al. |
| 2013/0055951 A1 | 3/2013 | Bruce et al. |
| 2013/0070158 A1 | 3/2013 | Hsieh et al. |
| 2013/0161971 A1 | 6/2013 | Bungo et al. |
| 2013/0278989 A1 | 10/2013 | Lam et al. |
| 2014/0036338 A1 | 2/2014 | Bareman et al. |
| 2014/0068434 A1 | 3/2014 | Filev et al. |
| 2014/0306505 A1 | 10/2014 | Koch |

* cited by examiner

ADDRESSABLE ELECTRO-OPTIC DEVICE

CROSS-REFERENCE TO RELATED APPLICATION

This application claims priority to and the benefit under 35 U.S.C. § 119(e) of U.S. Provisional Application No. 62/526,616, filed on Jun. 29, 2017, entitled "ADDRESSABLE ELECTRO-OPTIC DEVICE," the disclosure of which is hereby incorporated herein by reference in its entirety.

FIELD OF THE DISCLOSURE

The present disclosure generally relates to an electro-optic device, and more particularly to an addressable electro-optic device.

SUMMARY OF THE DISCLOSURE

According to one aspect of the present disclosure, an electro-optic device includes a front substrate defining a first surface and a second surface. A rear substrate defines a third surface and a fourth surface. A seal is disposed about a periphery of the second surface and the third surface. A space is defined between the front substrate, the rear substrate, and the seal. An electro-optic medium is disposed within the space. A first conductive material is disposed on the second surface of the front substrate. A second conductive material is disposed on the third surface of the rear substrate. At least one isolation line extends across at least one of the first conductive material and the second conductive material to define independently controlled dimming regions.

According to another aspect of the present disclosure, an electro-optic window includes a front substrate defining a first surface and a second surface. A rear substrate defines a third surface and a fourth surface. A seal is disposed about a periphery of the second surface and the third surface. A space is defined between the front substrate, the rear substrate, and the seal. An electro-optic medium is disposed within the space. A first conductive material is disposed on the second surface of the front substrate. A second conductive material is disposed on the third surface of the rear substrate. At least one isolation line extends across at least one of the first conductive material and the second conductive material to define independently controlled dimming regions. A barrier is placed adjacent to the isolation line and extends across the electro-optic medium to define independently controlled dimming regions.

According to yet another aspect of the present disclosure, an electro-optic window includes a first independently electro-optically dimmable region defined between first and second substrates. A second independently electro-optically dimmable region is defined between the first and second substrates. A controller is configured to operate one or both of the first and second electro-optically dimmable regions.

These and other features, advantages, and objects of the present disclosure will be further understood and appreciated by those skilled in the art by reference to the following specification, claims, and appended drawings.

DETAILED DESCRIPTION

Figure 1:
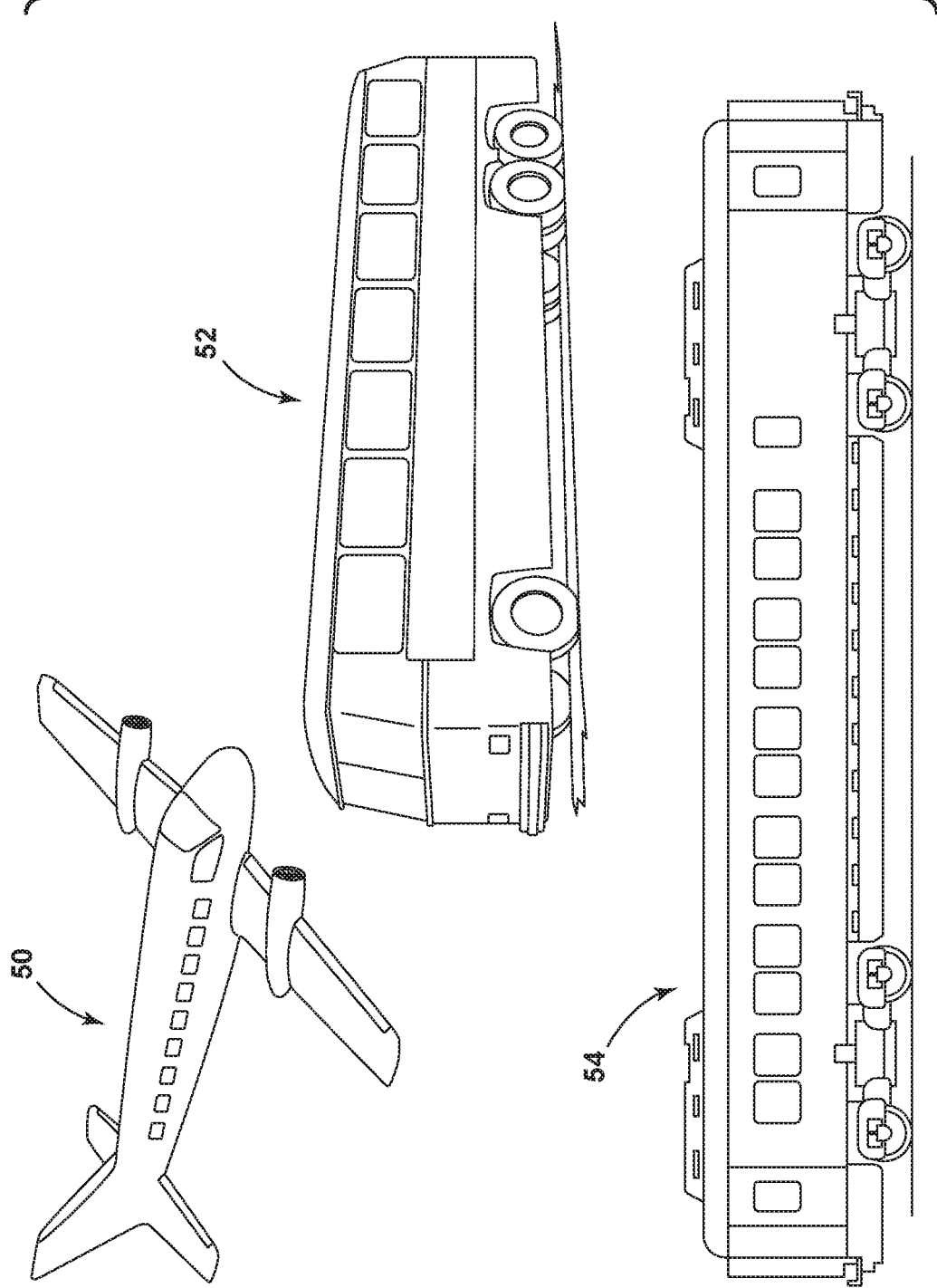
FIG. 1 is a front perspective view of various vehicles that may be configured for use with an electro-optic window of the present disclosure.

The present illustrated embodiments reside primarily in combinations of method steps and apparatus components related to an electro-optic device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-8, reference numeral 10 generally designates an electro-optic device that includes a front substrate 12 defining a first surface 14 and a second surface 16. A rear substrate 18 defines a third surface 20 and a fourth surface 22. A seal 24 is disposed about a periphery of the second surface 16 and the third surface 20. A space 25 is defined between the front substrate 12, the rear substrate 18, and the seal 24. An electro-optic medium 26 is disposed within the space 25. A first conductive material 30 is disposed on the second surface 16 of the front substrate 12. A second conductive material 32 is disposed on the third surface 20 of the rear substrate 18. At least one isolation line 40 extends across at least one of the first conductive material 30 and the second conductive material 32 to define independently controlled dimming regions 42, 44.

The electro-optic device 10, as set forth herein, is generally configured for use in a wide variety of applications, including for use in public transportation vehicles including planes 50, buses 52, trains 54, and automobiles. However, it will be understood that the electro-optic devices, as set forth herein, may be used in other applications, including civilian or military type uses. Further, although generally illustrated as being a window, the electro-optic device configurations, as set forth herein, can also be used in a wide variety of other applications, including, for example, rearview assemblies and sunroofs for use in vehicles.

Traditionally, window assemblies for mass transit have included a shade that is simply movable up and down against frictional components disposed within a shade frame that supports the shade. Accordingly, the shade can be adjusted to various heights, depending on the preferences of a user. For example, the shade can be completely closed if the user does not want to view through the window at all. Conversely, the shade can be completely opened such that the window is completely exposed, thereby providing a view of the scenery exterior to the vehicle. Alternatively, the shade can be adjusted to a position somewhere between completely closed and completely opened, which allows for a limited view to the exterior of the vehicle and limited light from outside of the vehicle into an interior of the vehicle. The electro-optic device 10, as set forth herein, is generally configured to accommodate users that desire to have a shadeless window or a variable transmissivity window that can be used with a shade, wherein a portion of the window can be darkened, or a portion of the window can be lightened, without having to commit to completely darkening the window or completely lightening the window.

With reference again to FIGS. 2A and 2B, an example of the electro-optic device 10 is illustrated in the form of a variable transmittance window. The window includes a window control system C having a controller 55 configured to adjust the relative transmittance of the electro-optic device 10. The electro-optic device 10 may be an electro-chromic device. In the illustrated construction, the front substrate 12 and the rear substrate 18 are constructed from generally clear glass. However, it will be understood that other materials may also be used. For example, the front and rear substrates 12, 18 may be constructed from a clear polymeric material of varying thicknesses. As previously noted, each of the front substrate 12 and the rear substrate 18 includes a conductive material. More specifically, the first conductive material 30 is disposed on the second surface 16 of the front substrate 12, while the second conductive material 32 is disposed on the third surface 20 of the rear substrate 18. The first and second conductive materials 30, 32 are generally transparent and electrically conductive. One example of a transparent electrically conductive material includes indium tin oxide (ITO), which is disposed on each of the second surface 16 and the third surface 20. Alternatively, the transparent conductive layers, including the first and second conductive materials 30, 32, may be made from a fluorine doped tin oxide, doped zinc oxide, indium zinc oxide, etc.

As illustrated, the front substrate 12 and the rear substrate 18 are mounted within a bezel 60. The bezel 60 is generally elastomeric and is secured in place by a middle reveal 62 and an outer reveal 64. The middle reveal 62 and the outer reveal 64, as well as the electro-optic device 10, are joined to and secured in place by an inner reveal 66 and an outer mounting structure 68. The inner reveal 66 and the middle reveal 62 secure a dust cover 70 for protecting the electro-optic device 10. The dust cover 70 may be generally transparent and constructed of a polymeric material. The bezel 60 is composed of a material that is generally strong enough to retain the electro-optic device 10, while at the same time insulating electro-optic device 10 from structural stresses and forces that may be applied to the bezel 60 by the middle reveal 62, the inner reveal 66, and the outer reveal 64, as well as the outer mounting structure 68, when the vehicle is in operation. The outer reveal 64 and the middle reveal 62 may be made from a thermally conductive plastic. The thermally conductive plastic may be configured to be strong enough to provide structural support for the electro-optic device 10, as well as the bezel 60. When the electro-optic device 10 is in a darkened state, the electro-optic device 10 may absorb light, which in turn generates heat. By utilizing a thermally conductive plastic, excess heat that is generated by the electro-optic device 10 may be dissipated through the middle, outer, and inner reveals 62, 64, 66.

With reference again to FIGS. 2A and 2B, the isolation line 40 is disposed on one or both of the front substrate 12 and the rear substrate 18. More specifically, the isolation line 40 is configured to extend across at least one of the first conductive material 30 and the second conductive material 32, which are disposed on the second surface 16 and the third surface 20, respectively. The isolation line 40 provides a disconnect of conductivity across the first conductive material 30 and/or the second conductive material 32. Accordingly, the first independently controlled dimming region 42 can be controlled independently of the second independently controlled dimming region 44. Likewise, the second independently controlled dimming region 44 can be controlled and adjusted independently of the first independently controlled dimming region 42. It will be understood that more than two independently controlled dimming regions may be disposed on the electro-optic device 10. In the illustrated embodiment, one isolation line 40 is illustrated extending through each of the first conductive material 30 and the second conductive material 32. However, additional isolation lines 40 may also be provided, which provide for additional dimming regions on the electro-optic device 10. Stated differently, more than one isolation line can be provided that extends across at least one or both of the first conductive material and the second conductive material to define three or more independently controlled dimming regions. Accordingly, a third independently controlled dimming region, a fourth independently controlled dimming region, a fifth independently controlled dimming region etc., may be possible upon the introduction of additional isolation lines 40 or an equivalent, as set forth herein, that extends across the electro-optic device 10.

Figure 2A:
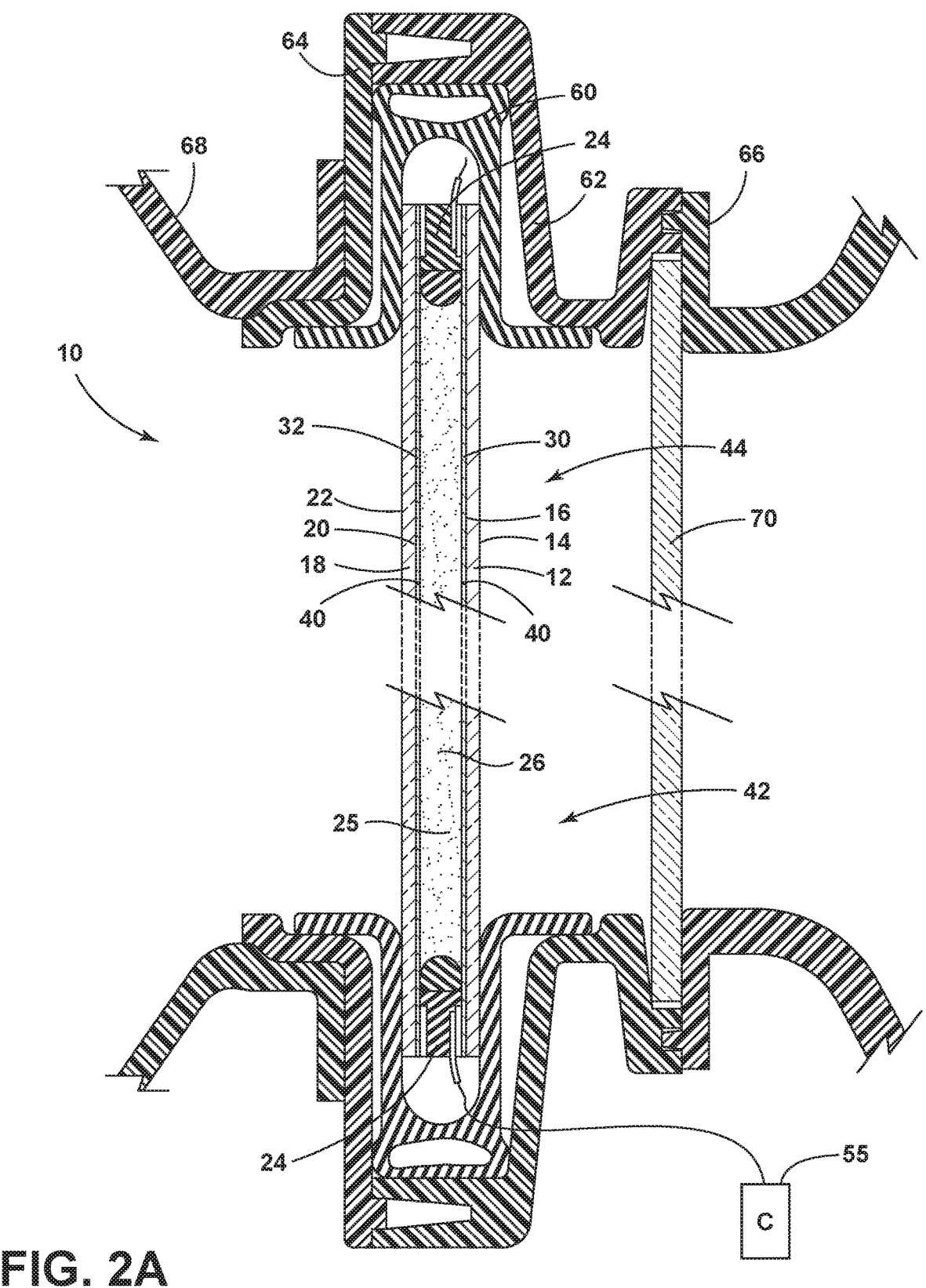
FIG. 2A is a side elevational cross-sectional view of an electro-optic window of the present disclosure.

With reference to FIG. 2A, the isolation line 40 may be constructed in a multitude of ways. For example, the isolation line 40 may be developed by laser ablation to divide conductive material disposed on one of the front and rear substrates 12, 18 into two separate areas. Mechanical scribing can also be used, as well as other possible techniques that create a discontinuity across the conductive material. The isolation line may be as wide as 1 millimeters in some applications, 100 micrometers in other applications, and as small as 3 micrometers in still other applications. The isolation line 40 may be linear, arcuate, sinusoidal, etc. Stated differently, the isolation line 40 can take on any of a variety of shapes. The isolation line 40 may be as small as three microns or larger than three microns.

Figure 2B:
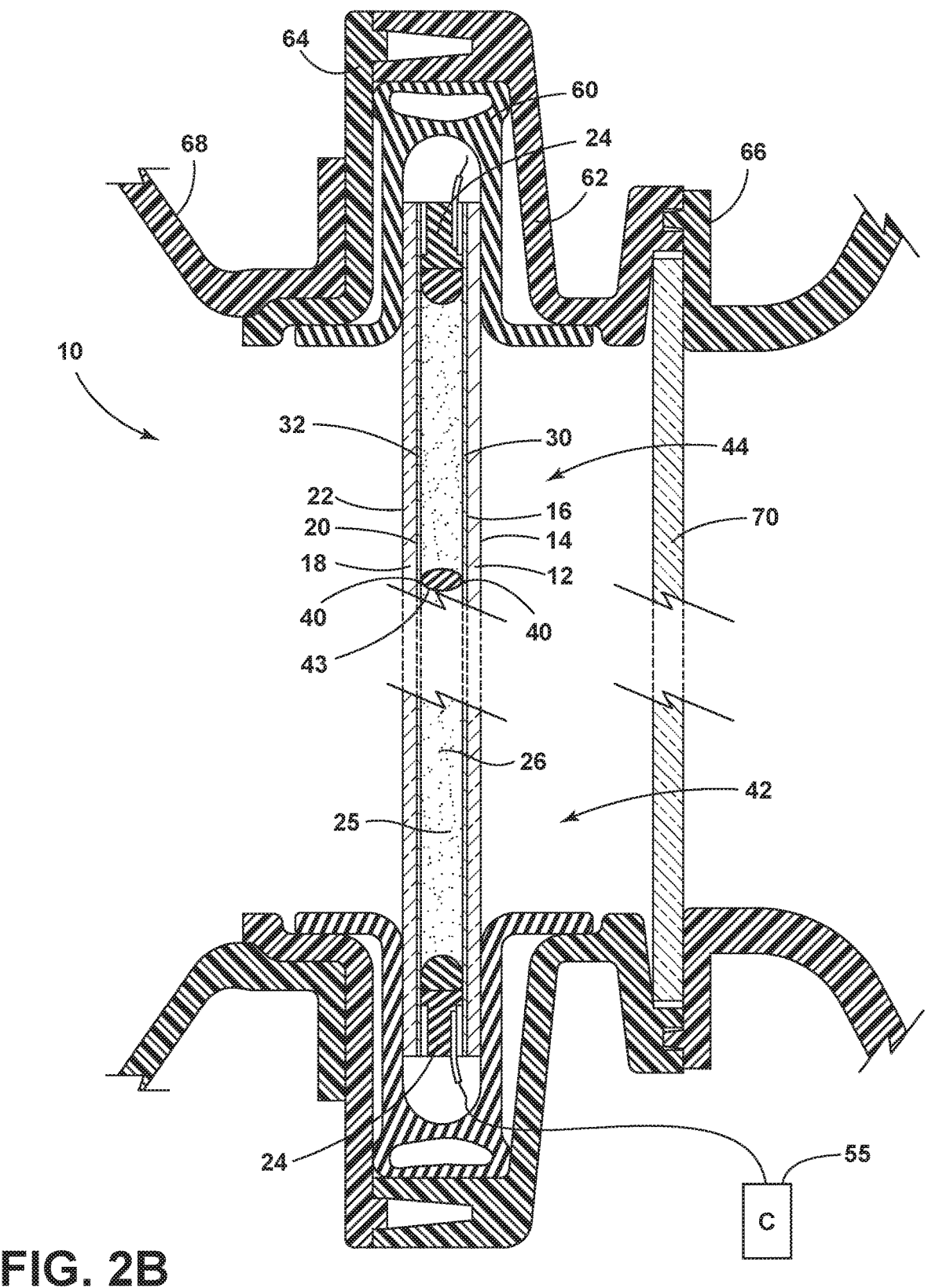
FIG. 2B is a side elevational cross-sectional view of an alternate electro-optic window of the present disclosure.
Figure 3:
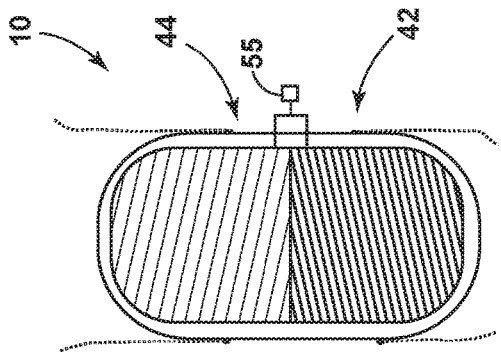
FIG. 3 is a front elevational view of an electro-optic window of the present disclosure.

In addition, as illustrated in FIG. 2B, it is also contemplated that a barrier, such as a secondary seal 43, may be introduced proximate the isolation line 40. The secondary seal 43 may be, for example, a thermally cured epoxy seal. The thermally cured epoxy may also be a clear epoxy. The secondary seal 43 acts to separate the electro-optic medium 26 disposed adjacent to the first independently controlled dimming region 42 from the electro-optic medium 26 disposed proximate the second independently controlled dimming region 44. The secondary seal 43 may be used in conjunction with or in place of one or more isolation lines 40. In addition, the seal 43 may be operably coupled with the peripheral seal 24. Alternatively, the seal 43 may be isolated from the peripheral seal 24. It will be understood that any number of dimming regions of varying sizes may be provided, depending on the locale of the isolation lines 40 and/or clear seals. As one example, a first dimming region could be disposed proximate a lower one-sixth of the surface area of the electro-optic device 10. A second dimming region could be disposed adjacent to the first dimming region and cover approximately one-third of a lower central portion of the surface area of the electro-optic device 10, and a third dimming region could be disposed adjacent to the second dimming region and cover approximately the top half of the surface area of the electro-optic device 10. However, this is one example. Several other possible constructions may be provided with various numbers of independently electro-optically dimmable regions, depending on the application and the intended use.

Figure 5:
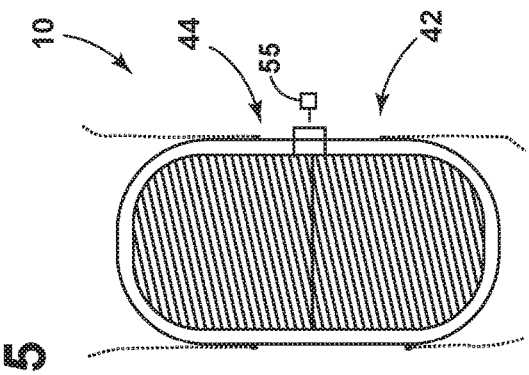
FIG. 5 is a front elevational view of another electro-optic window of the present disclosure.
Figure 4:
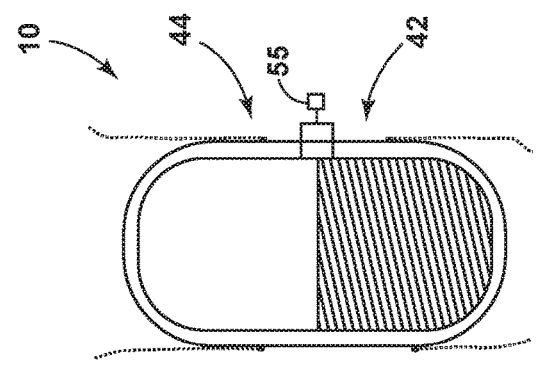
FIG. 4 is a front elevational view of another electro-optic window of the present disclosure.
Figure 7:
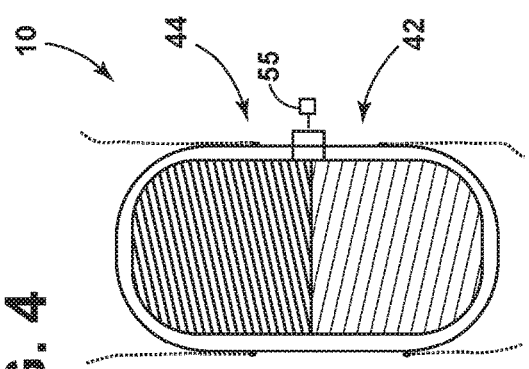
FIG. 7 is a front elevational view of another electro-optic window of the present disclosure.
Figure 6:
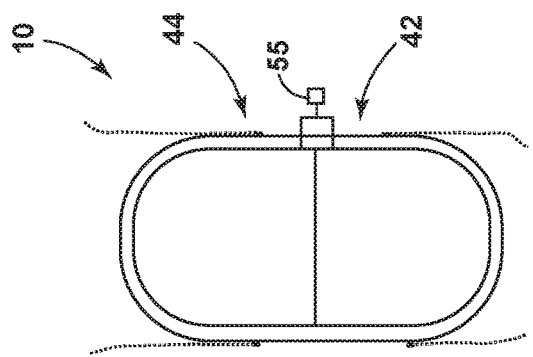
FIG. 6 is a front elevational view of another electro-optic window of the present disclosure.
Figure 8:
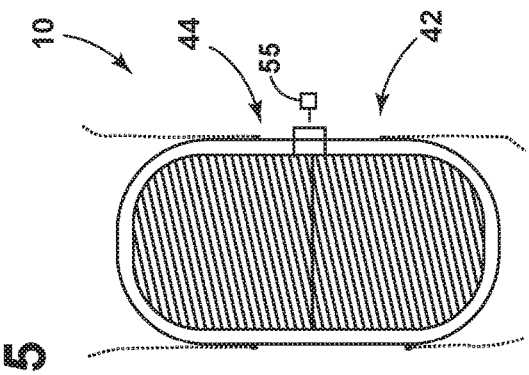
FIG. 8 is a front elevational view of another electro-optic window of the present disclosure.

With reference to FIGS. 3-8, various dimming states of the first and second independently controlled dimming regions 42, 44 are illustrated. For example, in FIG. 3, the first independently controlled dimming region 42 and the second independently controlled dimming region 44 are generally clear. FIG. 4 illustrates darkening of only the first independently controlled dimming region 42, while the second independently controlled dimming region 44 is maintained generally clear. In FIG. 5, the first independently controlled dimming region 42 is maintained in a darkened state, while the second independently controlled dimming region 44 is darkened slightly, but not as dark as the first independently controlled dimming region 42. Although the dimming states of the first and second independently controlled dimming regions 42, 44 are illustrated, the number of independently controlled dimming regions may include a plurality of such independently controlled dimming regions depending on the desired functionality and properties of the electro-optic device 10. In FIG. 6, the second independently controlled dimming region 44 is fully darkened, while the first independently controlled dimming region 42 is maintained in a generally clear state. FIG. 7 is similar to FIG. 6, but the first independently controlled dimming region 42 is darkened slightly. FIG. 8 illustrates both the first and second independently controlled dimming regions 42, 44 in a fully darkened state. In this instance, the controller 55 may be configured to dim the first and second independently controlled dimming regions 40, 44 simultaneously and uniformly. It will be understood that for each dimming region, regardless of the number of dimming regions, the amount of transmissivity of light through the electro-optic device 10 may vary. Accordingly, at each dimming region, the electro-optic device 10 may be adjusted to a fully darkened state, a fully clear state, or a grayscale state having a transmissivity that is anywhere between the fully darkened state and the fully clear state.

Figure 9:
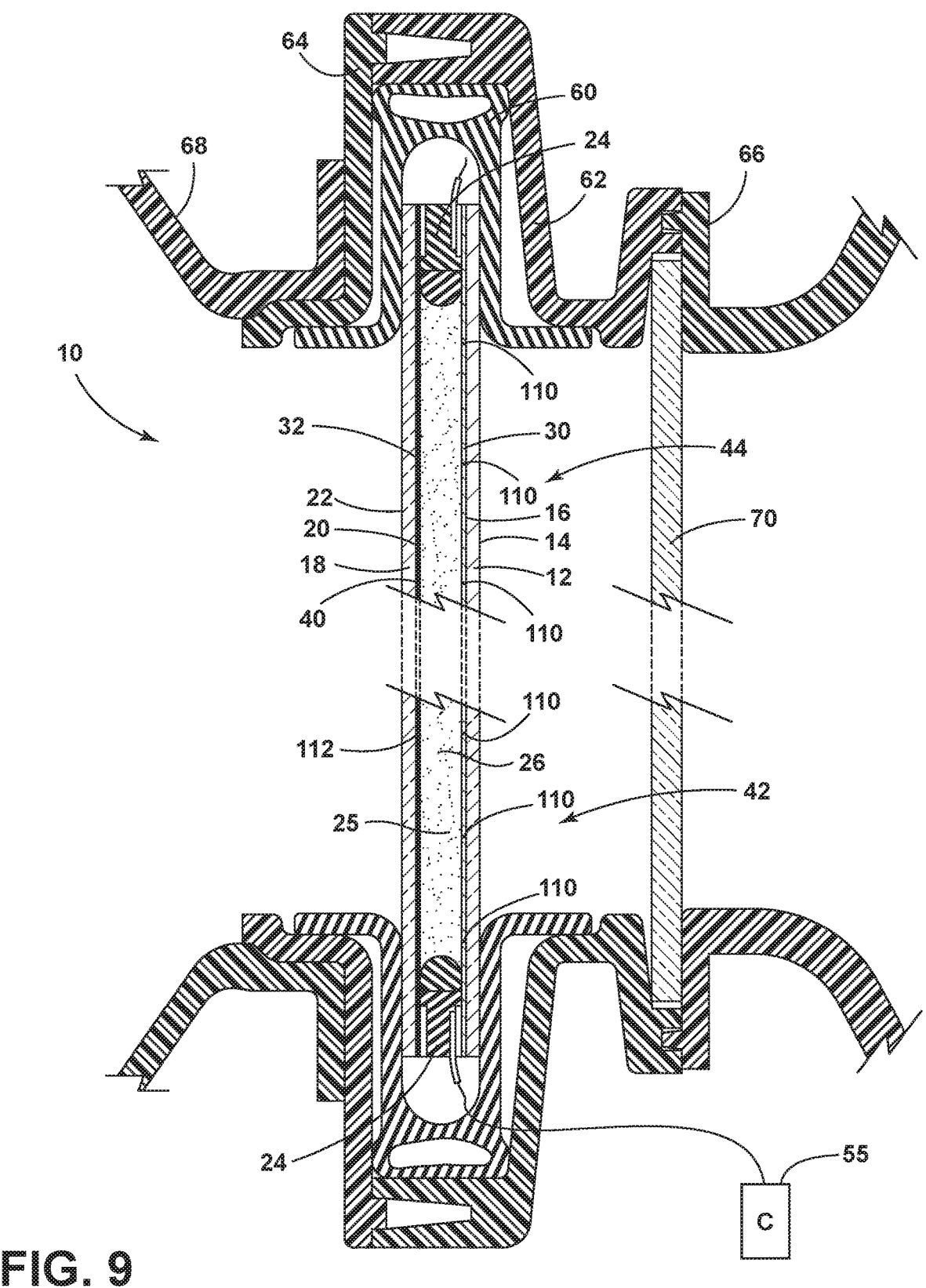
FIG. 9 is a side elevational cross-sectional view of an electro-optic window of the present disclosure.

With reference now to FIG. 9, an electro-optic device 100 is illustrated which includes features similar to the electro-optic device 10 described above. Those features that are similar to the electro-optic device 10 will be noted with like reference numerals. The electro-optic device 100 includes both the front substrate 12 and the rear substrate 18. However, one of the front substrate 12 and the rear substrate 18 includes vertical isolation lines 112 rather than horizontal isolation lines 110. The other of the front substrate 12 and the rear substrate 18 still includes horizontal isolation lines 110. It will be understood that the vertical isolation lines 112 and the horizontal isolation lines 110 may include similar spacing, or may include varying spacing. In addition, it will be understood that the size and width of the horizontal isolation lines 110 may be larger than, the same size as, or smaller than the size and width of the vertical isolation lines 112. Additionally the horizontal isolation lines 110 and vertical isolation lines 112 may be oriented in a variety of different orientations where the respective isolation lines may not be required to be parallel with one another on either substrate.

With reference to the illustration in FIG. 9, the horizontal isolation lines 110 extend across the front substrate 12 in a spaced arrangement across the first conductive material 30. As a result, the horizontal isolation lines 110 provide a disconnect of conductivity between adjacent regions that are disposed on the second surface 16 and which extend horizontally. The controller 55 may be configured to select particular regions for darkening or lightening, as set forth herein. The rear substrate 18, which includes vertical isolation lines 112 extend vertically on the third surface 20 of the rear substrate 18. As a result, a plurality of elongate regions that extend vertically are positioned adjacent to one another laterally. These regions may vary in size and shape to provide the desired functionality and properties of the electro-optic device 10. A user may utilize the controller 55 to adjust any of the regions across the third surface 20 of the rear substrate 18. The vertical isolation lines 112 provide a disconnect of conductivity across the second conductive material 32. It is generally contemplated that each region may have at least one electrical contact. Accordingly, there may be at least four electrical contacts for the vertical regions and at least four electrical contacts for the horizontal regions. It is also generally contemplated that the horizontal isolation lines 110 and vertical isolation lines 112 may be generally visible to a user, may be partially visible to a user, or generally not visible to a user at all, depending on the application.

Figure 10:
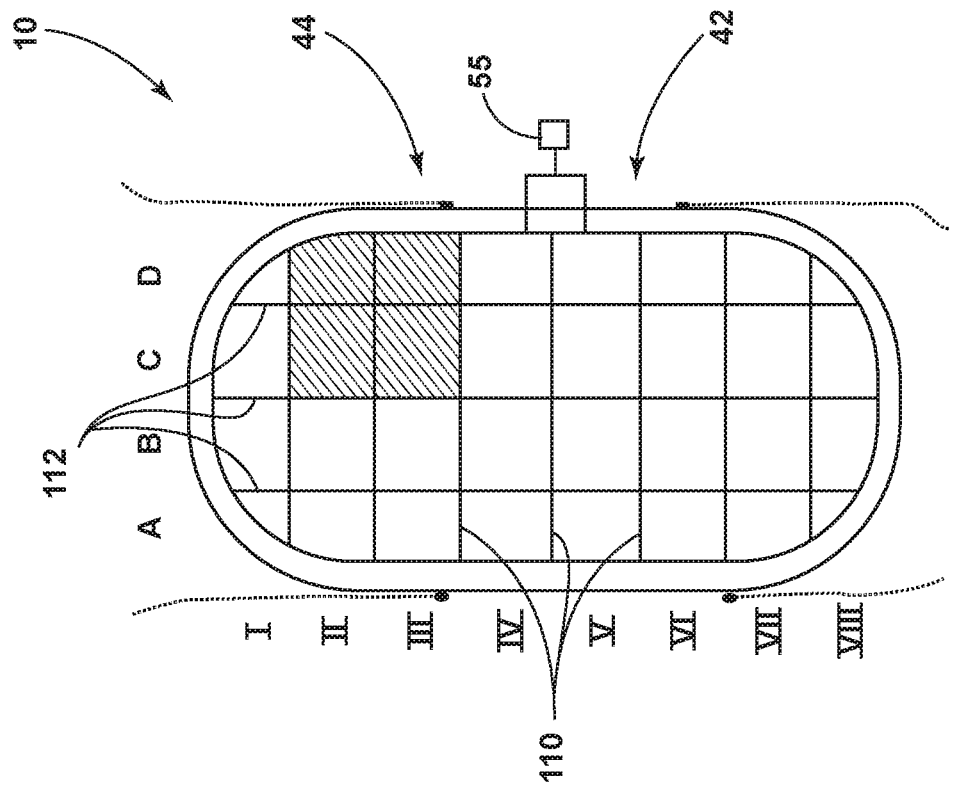
FIG. 10 is a front elevational view of an electro-optic window of the present disclosure.
Figure 11:
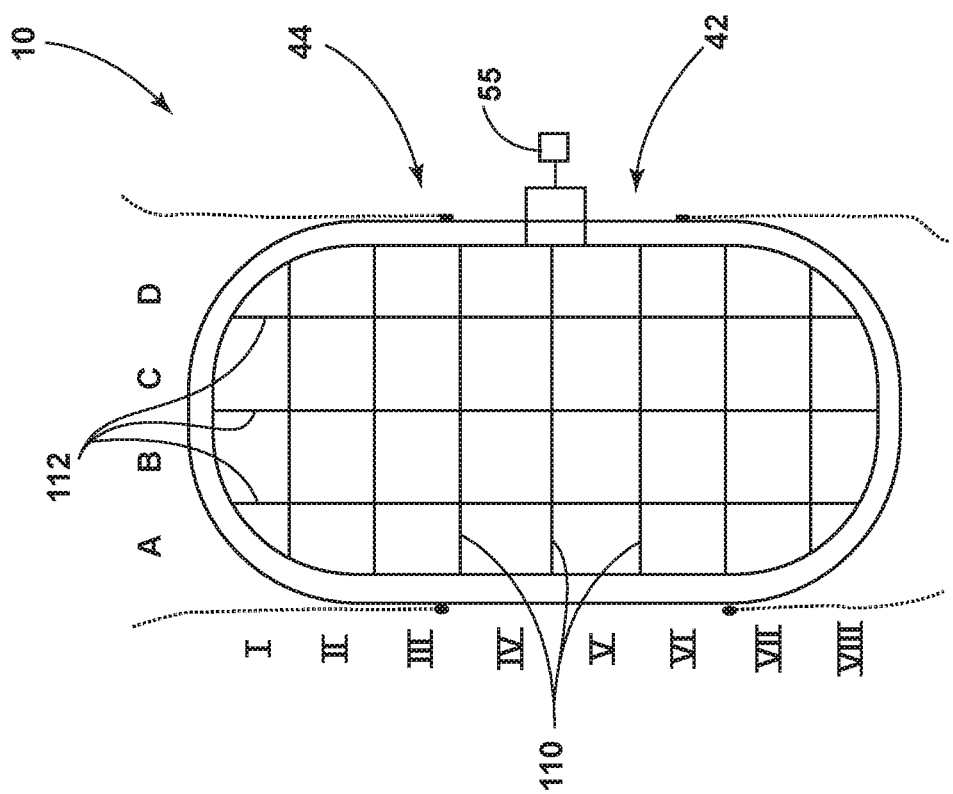
FIG. 11 is a front elevational view of the electro-optic window of FIG. 10, with desired regions at least partially darkened.

With reference to FIGS. 10 and 11, the controller 55 may be configured to darken particular areas defined by intersecting the horizontal isolation lines 110 and the vertical isolation lines 112. For example, if a light source, for example the sun, is disposed outside the electro-optic device 100 and the user desires to lessen the light infiltration through the electro-optic device 100, the user can utilize the controller 55 to darken areas defined by intersecting the horizontal isolation lines 110 and the vertical isolation lines 112. As shown in FIG. 11, the horizontal isolation lines 110 and the vertical isolation lines 112 that define C-II, D-II, C-III, and D-III are darkened. However, it will be understood that any area or areas within the grid can be darkened singly or simultaneously by manual entry of the selection into the controller, as desired by the user. In addition, it will be understood that the controller 55 that governs darkening of each area or areas may be set to automatically darken any area or areas within the grid, based on the transition of time, time of day, temperature, total brightness, etc. The controller 55 may also be configured to transition darkened areas to lightened areas and lightened areas to darkened areas based on predefined criteria set by the user. Further, it is generally contemplated that the first surface 14 of the front substrate 12 may include technologies such as resistive touch, capacitive touch, projected capacitive touch, surface acoustic wave touch, etc., to inform the controller 55 which area or areas to darken or lighten. For example, the user may touch a portion of the first surface 14 of the front substrate 12, thereby darkening a desired region of the electro-optic device 100.

With reference again to FIGS. 9-11, it will be understood that the horizontal isolation lines 110 and the vertical isolation lines 112 may be replaced by or used in concert with a barrier or secondary seal 43, as disclosed in detail above. For example, a barrier or secondary seal 43 may be disposed on both the first conductive material 30 of the front substrate 12 and the second conductive material 32 of the rear substrate 18. Alternatively, isolation lines may extend across the first conductive material 30 of the front substrate 12, while a barrier or secondary seal 43 extends across the second conductive material 32 of the rear substrate 18. Conversely, isolation lines may extend across the second conductive material 32 of the rear substrate 18, while a barrier or secondary seal 43 extends across the first conductive material 30 of the front substrate 12. The barrier or secondary seal 43 may extend in a vertical or horizontal direction.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electro-optic device comprising:
   a front substrate defining a first surface and a second surface;
   a rear substrate defining a third surface and a fourth surface;
   a seal disposed about a periphery of the second surface and the third surface, wherein a space is defined between the front substrate, the rear substrate, and the seal;
   an electro-optic medium disposed within the space;
   a first conductive material disposed on the second surface of the front substrate;
   a second conductive material disposed on the third surface of the rear substrate; and
   at least one horizontal isolation line extending across the front substrate and at least one vertical isolation line extending across the rear substrate, wherein the at least one horizontal isolation line and the at least one vertical isolation line define independently controlled dimming regions, and wherein the independently controlled dimming regions are configured to be selectively darkened or lightened.

2. The electro-optic device of claim 1, wherein the at least one horizontal and the at least one vertical isolation lines are defined by mechanical removal of a portion of at least one of the first conductive material and the second conductive material.

3. The electro-optic device of claim 1, wherein the at least one horizontal and the at least one vertical isolation lines are laser ablated onto at least one of the second surface and the third surface.

4. The electro-optic device of claim 1, wherein the at least one horizontal and the at least one vertical isolation lines are at least three microns wide.

5. The electro-optic device of claim 1, wherein the at least one horizontal and the at least one vertical isolation lines are disposed in a position such that a first independently controlled dimming region is less than half the size of a second independently controlled dimming region.

6. The electro-optic device of claim 1, wherein the at least one horizontal isolation line and the at least one vertical isolation line define three or more independently controlled dimming regions.

7. An electro-optic window comprising:
a front substrate defining a first surface and a second surface;
a rear substrate defining a third surface and a fourth surface;
a seal disposed about a periphery of the second surface and the third surface, wherein a space is defined between the front substrate, the rear substrate, and the seal;
an electro-optic medium disposed within the space;
a first conductive material disposed on the second surface of the front substrate;
a second conductive material disposed on the third surface of the rear substrate; and
a secondary seal extending between the front substrate and the rear substrate, wherein the secondary seal is configured to separate independently controlled dimming regions.

8. The electro-optic window of claim 7, wherein the secondary seal includes a clear epoxy.

9. The electro-optic window of claim 7, wherein the secondary seal includes a thermally cured epoxy seal.

10. The electro-optic window of claim 7, wherein at least one isolation line extends across at least one of the first conductive material and the second conductive material in proximity of the secondary seal.

11. The electro-optic window of claim 7, wherein the secondary seal is disposed in a position such that a first independently controlled dimming region is less than half the size of a second independently controlled dimming region.

12. An electro-optic window comprising:
a first independently electro-optically dimmable region defined between first and second substrates;
a second independently electro-optically dimmable region defined between the first and second substrates;
a controller configured to operate one or both of the first and second independently electro-optically dimmable regions;
horizontal isolation lines disposed on the first substrate and vertical isolation lines disposed on the second substrate, wherein the horizontal and vertical isolation lines define the first and second independently electro-optically dimmable regions; and
a barrier extending between the first and second substrates, wherein the barrier is configured to separate the first and second independently electro-optically dimmable regions.

13. The electro-optic window of claim 12, further comprising:
a third independently electro-optically dimmable region defined between the first and second substrates.

14. The electro-optic window of claim 12, wherein the horizontal and vertical isolation lines are disposed in a position such that the first independently electro-optically dimmable region is less than half the size of the second independently electro-optically dimmable region.

15. The electro-optic window of claim 12, wherein the horizontal and vertical isolation lines are defined by mechanical removal of a portion of at least one of a first conductive material disposed on the first substrate and a second conductive material disposed on the second substrate.

16. The electro-optic window of claim 12, wherein the barrier extends between the first and second substrates through an electro-optic medium to define the first and second independently electro-optically dimmable regions.

17. The electro-optic window of claim 12, wherein the barrier includes a thermally cured epoxy seal.

18. The electro-optic window of claim 12, wherein the barrier is a secondary seal that extends across the first and second substrates and which is operably coupled with a seal disposed about a periphery of the first and second substrates.

19. The electro-optic window of claim 12, wherein the controller is configured to simultaneously and uniformly dim the first and second independently electro-optically dimmable regions.

* * * * *